United States Patent
Serra et al.

(10) Patent No.: US 8,910,510 B2
(45) Date of Patent: Dec. 16, 2014

(54) METHOD FOR DIAGNOSING THE PERFORMANCE OF A CATALYTIC CONVERTER

(75) Inventors: Bruno Serra, Etampes (FR); Remi Fouret, Gennevilliers (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 658 days.

(21) Appl. No.: 13/127,302

(22) PCT Filed: Nov. 5, 2009

(86) PCT No.: PCT/EP2009/064667
§ 371 (c)(1),
(2), (4) Date: Jul. 11, 2011

(87) PCT Pub. No.: WO2010/052261
PCT Pub. Date: May 14, 2010

(65) Prior Publication Data
US 2011/0252867 A1 Oct. 20, 2011

(30) Foreign Application Priority Data
Nov. 6, 2008 (FR) .................................... 08 06209

(51) Int. Cl.
*F01N 1/00* (2006.01)
*F01N 11/00* (2006.01)
*F01N 3/20* (2006.01)

(52) U.S. Cl.
CPC ......... *F01N 11/007* (2013.01); *F01N 2560/025* (2013.01); *F01N 2900/1621* (2013.01); *F01N 2560/14* (2013.01); *Y02T 10/47* (2013.01); *F01N 3/20* (2013.01); *F01N 2550/02* (2013.01)

USPC ........................................................ 73/114.75

(58) Field of Classification Search
USPC ........................................................... 73/1.01
See application file for complete search history.

(56) References Cited

U.S. PATENT DOCUMENTS 6,116,021 A * 9/2000 Schumacher et al. .......... 60/274
6,868,666 B2 * 3/2005 Frank et al. ..................... 60/274

FOREIGN PATENT DOCUMENTS

| EP | 1 471 220 A2 | 10/2004 |
| JP | 8-177469 A | 7/1996 |
| WO | 01/49993 A1 | 7/2001 |

OTHER PUBLICATIONS

International Search Report w/translation from PCT/EP2009/064667 dated Dec. 21, 2009 (4 pages).

\* cited by examiner

*Primary Examiner* — Robert R Raevis
(74) *Attorney, Agent, or Firm* — Osha Liang LLP

(57) ABSTRACT

The invention relates to a method for diagnosing the performance of a catalytic converter (3) of a petrol automobile onboard the vehicle, the catalytic converter being mounted on the exhaust line (1) of the vehicle, wherein said method comprises placing two oxygen probes (5, 6) on the exhaust line (1) upstream and downstream from the converter (3), respectively, analysing the signals (7, 16) thereof, and comparing the signal (16) of the downstream probe (6) with a threshold in order to carry out a passive diagnosis during a first period of the lifespan of the converter (3), after which, during a last period of the converter (3) lifespan, an intrusive diagnosis of the converter (3) performance is carried out using the two probes (5, 6) and a diagnosis automaton, by measuring the oxygen storage capacity of the converter (3).

2 Claims, 2 Drawing Sheets

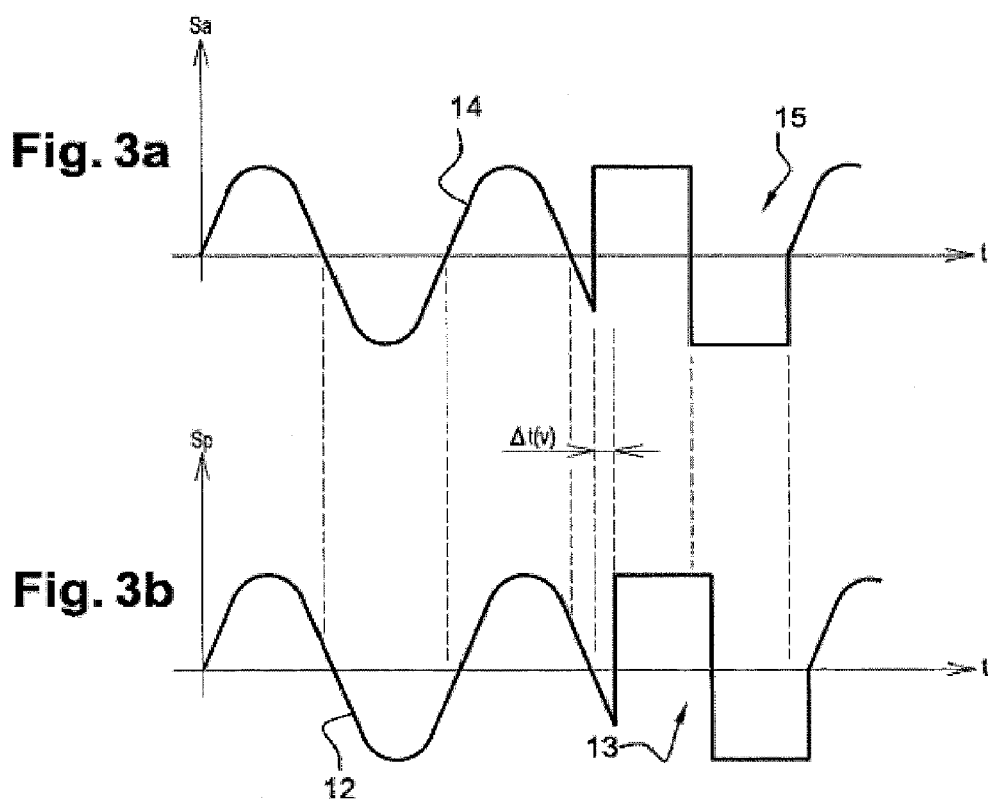

METHOD FOR DIAGNOSING THE PERFORMANCE OF A CATALYTIC CONVERTER

FIELD OF INVENTION

The field of the invention is that of catalytic converters of gasoline-fuelled motor vehicles and more particularly of the onboard diagnosis of these converters.

BACKGROUND OF THE INVENTION

A catalytic converter is a member that is installed on the exhaust line of the motor vehicle, upstream of a silencer. It is a filter designed to reduce the emissions of pollutant gases (HC, CO, NOx etc.). More particularly, it involves a ceramic block comprising channels that are coated internally with a catalyst and that the exhaust gases pass through.

For some time now, governments, notably those of the European Union, have enacted standards that have forced manufacturers to install catalytic converters of increasing efficiency and to offer an onboard diagnostic service for diagnosing the performance of the converters as they age.

SUMMARY OF THE INVENTION

Initially proposed was a diagnostic method called a passive method because it involved observing without intervening. For this purpose, use is made of a system with two oxygen probes placed respectively in the exhaust pipe upstream and downstream of the catalytic converter. In practice, only the signal from the downstream probe is observed. The oxygen probes measure the electric voltage generated by the movement of the oxygen ions present in the exhaust gases. The signal from the upstream probe has a sinusoidal appearance, reflecting the richness adjustment of the mixture taken in by the engine, which oscillates by alternating the rich phases and the lean phases. This alternation makes it possible to have an optimal conversion of the exhaust gases by the catalytic converter.

When it is first used, when the converter is new, the signal from the downstream probe is a virtually flat signal. Gradually, as the catalytic converter ages, the signal from the downstream probe is disrupted, varies and amplifies progressively in order to take a form that is also sinusoidal. At the end of the service life of the catalytic converter, the catalyst no longer taking action, the post-catalytic signal from the downstream probe is virtually identical to that of the upstream probe, only shifted in time by an interval that is necessary for the gases to pass from one of the two probes to the other.

The diagnosis consists in comparing the post-catalytic signal of the diagnosed converter with the post-catalytic signal of a benchmark catalytic converter.

Each change in the standard imposes increasingly low detection thresholds.

The passive diagnostic method is therefore no longer sufficiently accurate to satisfy the current detection criteria. As the standard changes, the diagnosis has also changed and the passive diagnostic method has been dropped and replaced by a method called an intrusive method.

According to the intrusive method, while continuing to use two oxygen probes upstream and downstream, and of which the respective signals are compared, action is taken in the operation of the engine, hence the intrusive qualifier, by stimulating the oxygen probes with a sequence of richness slots. Each stimulus consists in injecting more gasoline after the engine has been stabilized for a certain period, for example 3 s. The intrusive diagnosis is based on measuring the oxygen storage capacity (OSC).

At normal engine speed, the ratio $$Cr = \frac{\frac{Air}{Real\ fuel}}{\frac{Air}{Stroichiometric\ fuel}}$$

equals 1.

The stimulus that is caused is, in the signal from the upstream probe Sa, a double richness slot with a first lean slot (excess of air), with a Cr ratio in this instance greater than 1, and a second rich slot (excess of fuel), with a Cr ratio in this instance less than 1, as illustrated in FIG. 2. When the catalytic converter is new, the post-catalytic signal Sp reproduces the double richness slot as practically identical to that of the upstream signal Sa, but with a time shift of $\Delta t(n)$.

At the end of the effective life of the catalytic converter, while the portion of the post-catalytic signal outside the richness slot also becomes sinusoidal, virtually identical to that of the upstream signal Sa, the stimulus is reflected in the post-catalytic signal Sp by a double slot practically identical to that of the upstream signal Sa but offset in time by $\Delta t(v)$ that is much smaller than $\Delta t(n)$ (FIG. 3).

Since the characteristics of the double slot can be perfectly controlled by the software of the diagnostic programmable controller, unlike the sinusoidal portions of the curves of the signals Sa and Sp, the intrusive diagnostic method is much more accurate than the passive diagnosis. When $\Delta t(n)$ reaches a low threshold, an alarm is generated.

The applicant has proposed its invention after realizing the paradoxical side of the intrusive diagnosis. The function of a catalytic converter is to reduce the emissions of pollutant gases. However the stimuli of the intrusive diagnoses, with their enriching and weakening phases, are causes of pollution and this is so irrespective of the state of the catalytic converters. The paradox manifests itself moreover mostly when the converters are new and prevent pollution.

So the applicant has dared to go against the trend which requires increasing accuracy, in order to step backward and again propose a passive diagnosis during a first portion of the service life of catalytic converters in order subsequently to again satisfy the normative requirements and pass over to an intrusive diagnosis during a second portion of the service life of catalytic converters, the most crucial portion in matters of pollution.

Beyond the paradox revealed and the audaciousness of a backward step, the applicant has finally shown straightforward common sense by basing its invention on the fact that, since the standards were increasingly strict, manufacturers had to market powerful catalytic converters at least for a certain time. All this can only constitute proof of inventive step.

Therefore, the invention relates to a method for diagnosing the performance of a catalytic converter of a gasoline-fuelled motor vehicle, on board the vehicle, the catalytic converter being mounted on the exhaust line of the vehicle, wherein two oxygen probes are placed on the exhaust line respectively upstream and downstream of the converter, their signals are analyzed and the signal of the downstream probe is compared with a threshold in order to carry out a passive diagnosis during a first period of the service life of the converter, beyond which, during a last period of the service life of the converter, with the aid of the two probes and of a diagnostic programmable controller and by measuring the oxygen-storage capacity of the converter, an intrusive diagnosis of the performance of the converter is carried out.

Advantageously, the transition between the passive diagnosis and the intrusive diagnosis is predetermined by the crossing of a low threshold by the time shift between the two signals from the two probes, the threshold being determined freely because it is not standardized.

Preferably, the transition threshold is determined by an emission level of a standard in force, for example Euro 5.

BRIEF DESCRIPTION OF THE DRAWINGS

FIG. 3 illustrates signals from probes of a worn converter.

DETAILED DESCRIPTION OF THE PREFERRED EMBODIMENTS

Figure 1:
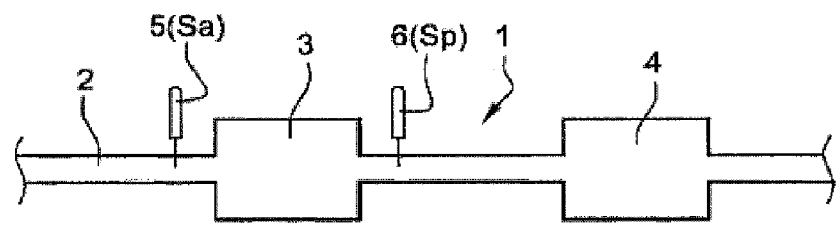
FIG. 1 is a schematic of an exhaust line of an engine.

With reference to FIG. 1, which represents schematically an exhaust line of an engine of a gasoline-fuelled motor vehicle, the exhaust line 1 of the motor vehicle comprises, on the pipe 2, a catalytic converter 3 and, downstream of the converter 3, a silencer 4. Two oxygen probes 5, 6 are placed on the pipe 2 respectively upstream (5) and downstream (6) of the converter 3. The downstream probe 6 (Sp) is a post-catalytic probe, the upstream probe 5 (Sa), a pre-catalytic probe. FIG. 2 corresponds to the signals of the probes Sa and Sp associated with a practically new catalytic converter. Shown in FIG. 2 is the signal from the pre-catalytic probe (Sa) 5 in the intrusive diagnosis phase. Before the stimulus, the signal is a conventional sine curve 7 consisting of alternations of rich state and of lean state. The stimulus 8 is illustrated by a slot at a high state 9 followed by a slot at a low state 10. After the stimulus, the curve resumes its sinusoidal form. In FIG. 2b, the curve 16 of the signal from the post-catalytic probe (Sp) 6, before and after the stimulus 11, is practically flat. The stimulus slots 11 from the post-catalytic probe 6 are virtually the same as those of the signal from the probe 5, but shifted by $\Delta t(n)$. FIGS. 3a, 3b represent the signals from the two probes 5 (5a), 6 (Sp) but the catalytic converter 3 already being worn.

Figure 2A:
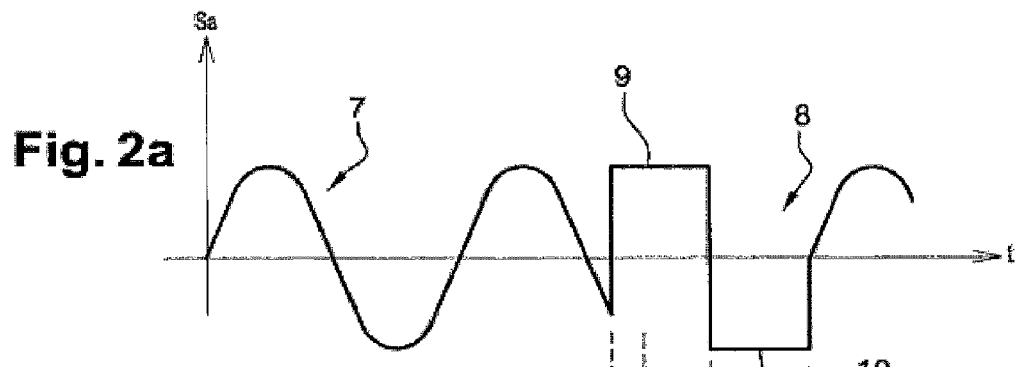
FIG. 2 illustrates signals of probes of a practically new converter.
Figure 2B:
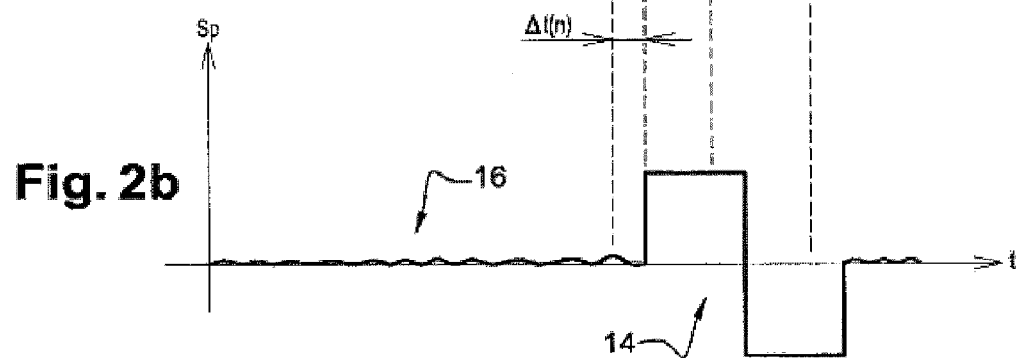

The curves of these figures differ from those of FIGS. 2a, 2b in that:
1) before and after the stimulus, the curve of the signal from the post-catalytic probe 6 is a sine curve that is practically identical to that of the curve of the signal from the pre-catalytic probe 5,
2) the stimulus slots 13 of the curve 12 of the signal 15 from the probe 6 are shifted relative to those of the curve 14 of the signal from the probe 5 by $\Delta t(v)$, much smaller than $\Delta t(n)$.

The invention claimed is:

1. A method for diagnosing the performance of a catalytic converter of a gasoline-fuelled motor vehicle, on board the vehicle, comprising:
    mounting the catalytic converter on an exhaust line of the motor vehicle, wherein two oxygen probes are placed on the exhaust line respectively upstream and downstream of the catalytic converter;
    analyzing signals from the two oxygen probes;
    comparing a signal of the downstream oxygen probe with a threshold in order to carry out a passive diagnosis during a first period of a service life of the catalytic converter; and
    carrying out an intrusive diagnosis of performance of the catalytic converter by measuring an oxygen-storage capacity of the catalytic converter, beyond the first period of the service life, during a last period of the service life of the catalytic converter, with the aid of the two oxygen probes and of a diagnostic programmable controller, wherein a transition between the passive diagnosis and the intrusive diagnosis is predetermined by crossing of a low threshold by a time shift between the two oxygen probe signals.

2. The diagnostic method as claimed in claim 1, wherein the transition threshold is determined by an emission level of a standard in force.

* * * * *